(12) United States Patent
Wong et al.

(10) Patent No.: US 7,486,612 B2
(45) Date of Patent: Feb. 3, 2009

(54) FAULT-TOLERANT MULTICASTING NETWORK

(75) Inventors: Allen Tsz-Chiu Wong, San Jose, CA (US); Zhidan Cheng, Sunnyvale, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 234 days.

(21) Appl. No.: 10/315,607

(22) Filed: Dec. 10, 2002

(65) Prior Publication Data

US 2004/0111606 A1    Jun. 10, 2004

(51) Int. Cl.
*H04J 1/16*    (2006.01)
*H04L 12/28*    (2006.01)

(52) U.S. Cl. .................................. 370/221; 370/390
(58) Field of Classification Search .............. 370/221, 370/390
See application file for complete search history.

(56) References Cited

U.S. PATENT DOCUMENTS

| | | | | |
|---|---|---|---|---|
| 5,463,763 | A * | 10/1995 | Kubo | 714/4 |
| 5,867,481 | A * | 2/1999 | Miyagi | 370/244 |
| 6,246,665 | B1 * | 6/2001 | Watanabe et al. | 370/218 |
| 6,295,615 | B1 * | 9/2001 | Cohen | 714/712 |
| 6,324,161 | B1 * | 11/2001 | Kirch | 370/217 |
| 6,327,260 | B1 * | 12/2001 | McGrew | 370/225 |
| 6,331,986 | B1 * | 12/2001 | Mitra et al. | 370/468 |
| 6,430,700 | B1 * | 8/2002 | Daruwalla et al. | 370/222 |
| 6,442,134 | B1 | 8/2002 | Mitchell | 370/223 |
| 6,452,942 | B1 * | 9/2002 | Lemieux | 370/468 |
| 6,512,774 | B1 * | 1/2003 | Vepa et al. | 370/401 |
| 6,532,088 | B1 * | 3/2003 | Dantu et al. | 398/43 |
| 6,553,034 | B2 * | 4/2003 | Chan et al. | 370/221 |
| 6,563,830 | B1 * | 5/2003 | Gershon et al. | 370/395.53 |
| 6,594,232 | B1 * | 7/2003 | Dupont | 370/224 |
| 6,616,350 | B1 * | 9/2003 | de Boer et al. | 370/222 |
| 6,639,896 | B1 * | 10/2003 | Goode et al. | 370/224 |
| 6,718,552 | B1 * | 4/2004 | Goode | 725/95 |
| 6,741,595 | B2 * | 5/2004 | Maher et al. | 370/392 |
| 6,754,221 | B1 | 6/2004 | Whitcher et al. | 370/401 |
| 6,763,190 | B2 * | 7/2004 | Agrawal et al. | 398/5 |
| 6,778,525 | B1 * | 8/2004 | Baum et al. | 370/351 |
| 6,798,751 | B1 * | 9/2004 | Voit et al. | 370/252 |
| 6,850,483 | B1 * | 2/2005 | Semaan | 370/218 |
| 6,873,618 | B1 * | 3/2005 | Weaver | 370/390 |
| 6,952,396 | B1 * | 10/2005 | Cottreau et al. | 370/222 |

(Continued)

OTHER PUBLICATIONS

"Presentation Slides", Prepared by Zhidan Cheng and Doug Ricketts, Prepared before Dec. 10, 2002.

*Primary Examiner*—Andrew Lee
(74) *Attorney, Agent, or Firm*—Mark C. Pickering

(57) ABSTRACT

A multicasting network includes a number of routers that are connected together to form a ring. The routers include a source router that identifies incoming multicasting data packets, and forwards the multicasting data packets in both directions on the ring. The routers also include forwarding routers that identify incoming multicasting data packets, and forwards the multicasting data packets in only one direction on the ring. Further, each ring has two terminating routers that receive forwarded data packets on two external nodes, and accept forwarded data packets from only a first external node and not from a second external node. When a fault condition is detected that prevents data packets from being forwarded in a first direction on the ring, the routers down stream of the fault condition reconfigure themselves to receive forwarded data packets from the second direction.

14 Claims, 4 Drawing Sheets

U.S. PATENT DOCUMENTS

| | | | | |
|---|---|---|---|---|
| 6,973,267 B1 * | 12/2005 | Arecco et al. | | 398/4 |
| 6,975,587 B1 * | 12/2005 | Adamski et al. | | 370/217 |
| 6,975,637 B1 * | 12/2005 | Lenell | | 370/412 |
| 7,031,201 B2 * | 4/2006 | Kim et al. | | 365/189.05 |
| 7,035,202 B2 * | 4/2006 | Callon | | 370/216 |
| 7,277,631 B1 * | 10/2007 | Iyer et al. | | 398/1 |
| 2001/0015979 A1 * | 8/2001 | Hata et al. | | 370/403 |

* cited by examiner

FAULT-TOLERANT MULTICASTING NETWORK

BACKGROUND OF THE INVENTION

1. Field of the Invention

The present invention relates to a multicasting network and, more particularly, to a fault-tolerant multicasting network.

2. Description of the Related Art

FIG. 1 shows a block diagram that illustrates a prior-art communications network 100. As shown in FIG. 1, network 100 includes a number of customer premises 110, a central office 112 that is connected to the customer premises 110, and an ATM network 114 that is connected to the central office 112.

In this example, each customer premise 110 has a data device 120, such as a personal computer, a standard telephone 122, and a xDSL modem 124 that is connected to the data device 120 and the telephone 122. In operation, the xDSL modem 124 at each customer premise 110 splits the incoming signals received from central office 112 into incoming data signals for the data device 120 and incoming plain old telephone service (POTS) signals for the telephone 122. In addition, the modem 124 transmits outgoing signals to central office 112 by combining the outgoing data signals from the data device 120 and the outgoing POTS signals from the telephone 122.

Referring again to FIG. 1, central office 112 has a digital subscriber line access multiplexer (DSLAM) 130 that is connected to the xDSL modems 124 in the customer premises 110, and an asynchronous transfer mode (ATM) switch 132 that is connected to DSLAM 130. In addition, central office 112 has an ATM router 134 that is connected to ATM switch 132 and the ATM network 114.

In operation, DSLAM 130 splits the outgoing signals received from each customer premise 110 into output POTS signals and output data signals. The output POTS signals are sent to the central office telephone switching system, while the output data signals are multiplexed together with the output data signals from the other customer premises to form an outgoing data stream.

DSLAM 130 also demultiplexes an incoming data stream from ATM switch 132 to form input data signals for each customer premise 110. Further, DSLAM 130 also combines the demultiplexed input data signals for a customer premise 110 with input POTS signals received from the central office switching system for the customer premise 110 to form the incoming signals for the customer premise 110.

In addition, ATM switch 132 receives the incoming data stream from DSLAM 130 and converts the data from a local data format to an ATM format. In the ATM format, data is loaded into fixed length packets known as cells. Each cell has a header section and a data section. The header section, in turn, includes a virtual connection identifier (VCI) that identifies the destination of the cell, and a virtual path identifier (VPI) that also identifies the destination of the cell. ATM switch 132 also converts received data from the ATM format to the local data format.

Further, router 134 examines the header section of the ATM cell and, based on the destination of the cell, forwards the cell to one of a number of other routers that are connected to ATM network 114. Router 134 also identifies ATM cells that are addressed to the downstream customer premises 110, and forwards those cells to ATM switch 132.

Central office 112 can be implemented with, for example, the Telliant 5000 Central Office System manufactured by Advanced Fiber Communications. One feature of the Telliant 5000 Central Office System is that router 134 includes a controller that has a multicast forwarding circuit. In the multicast forwarding circuit, router 134 identifies a received multicast data packet (e.g., using the internet group management protocol (IGMP)), and forwards the multicast data packet to one or more predefined outputs.

FIG. 2 shows a block diagram that illustrates a prior-art network 200. As shown in FIG. 2, network 200 has a number of routers 210, including routers 210-1 through 210-7, and a number of high-speed data lines 212 that are connected to the routers 210 to form an ATM ring 214. In the FIG. 2 example, the routers 210 have a controller that has a multicast forwarding circuit, such as the routers in a Telliant 5000 Central Office System.

The high-speed data lines 212 can be implemented with, for example, fiber optic cables to form ATM ring 214 as a synchronous optical network (SONET) ATM ring. When implemented as a SONET ATM ring, an OC-12 interface can be used at each router 210 to provide a capacity of approximately 600 Mbps.

There are two types of SONET ATM rings conventionally used: a unidirectional ATM switched ring (UASR) and a bidirectional ATM switched ring (BASR). The SONET UASR is defined by Bellcore standard GR-1230-CORE, while the SONET BASR is defined by Bellcore standard GR-1400-CORE.

A SONET UASR utilizes two fiber optic cables that run between the routers 210: a working fiber and a protective fiber. In operation, the same information is transmitted on the working and protective fibers in opposite directions. When a fault, such as a cut cable or an equipment failure, is detected in or with a segment of a working fiber, the adjacent protective fiber is used to allow data to continue on to the destination routers 210.

Similarly, a SONET BASR ring has four fiber optic cables that run between the routers 210: two working fibers and two protective fibers. One working fiber and one protective fiber are clockwise fibers, while one working fiber and one protective fiber are counter-clockwise fibers. As above, when a working fiber fails, traffic is diverted to the protective fiber. Thus, SONET rings have the ability to heal themselves and are therefore highly survivable.

Referring again to FIG. 2, since the routers 210 include the multicast forwarding circuit, one router 210 in the ring is logically defined to be a source router 210S, while the remaining routers 210 in the ring are logically defined to be forwarding routers 210F. The source router 210S identifies a received multicast data packet, passes the data packet on to the ATM switch (132) connected to the DSLAM, and forwards the multicast data packet on in both directions on ring 214 to the other routers 210.

One the other hand, the forwarding routers 210F identify a forwarded multicast data packet, pass the data packet on to the ATM switch connected to the DSLAM, and forward the multicast data packet on in only one direction on the ring. In addition, although a forwarding router 210F can only forward a multicast data packet in one direction on ring 214, the forwarding router 210F can forward the multicast data packet on to other routers 210.

Further, two forwarding routers 210F in ring 214 are also logically defined to be terminating routers 210T. Terminating routers 210T receive multicast data packets from two directions on the ring, and only process the multicast data packets from one direction, ignoring the packets from the other direction.

In the example shown in FIG. 2, router 210-1 is logically defined to be source router 210S, while routers 210-2 through 210-6 are logically defined to be forwarding routers 210F. In addition, routers 210-3 and 210-6 are both logically defined to be terminating routers 210T.

In operation, router 210-1 receives a data packet, identifies the packet as a multicast data packet, passes the data packet on to the ATM switch connected to the DSLAM, and forwards the multicast data packet to routers 210-2 and 210-4.

Router 210-2 receives the data packet, and identifies the packet as a multicast data packet. In addition, router 210-2 passes the packet on to the ATM switch connected to the DSLAM, and forwards the multicast data packet to router 210-3. Router 210-3 does the same as router 210-2, and forwards the multicast data packet on to router 210-6. However, as a terminating router, router 210-6 ignores the multicast data packet output by router 210-3.

Similarly, router 210-4 receives the data packet, and identifies the packet as a multicast data packet. Router 210-4 also passes the multicast data packet on to the ATM switch connected to the DSLAM, and forwards the multicast data packet to router 210-5. Router 210-5 does the same as router 210-4, and forwards the multicast data packet on to router 210-6. Router 210-6 does the same as router 210-5, and forwards the multicast data packet on to router 210-3.

However, as a terminating router, router 210-3 ignores the multicast data packet output by router 210-6. In addition, although router 210-5 can only forward the multicast data packet to router 210-6 as the next router in ring 214, router 210-5 can also forward the multicast data packet to router 210-7.

SUMMARY OF THE INVENTION

A router is disclosed according to an embodiment of the present invention. The router has a plurality of interfaces that include a first interface and a second interface. The first interface has a connection that receives valid data packets from a first medium, and transmits no data packets to the first medium unless the first interface can no longer receive valid data packets from the first medium.

A network is disclosed according to an embodiment of the present invention. The network has a first router and a second router. The first router has a plurality of interfaces that include a first interface and a second interface. The first interface has a connection that receives valid data packets from a first medium and transmits no data packets to the first medium unless the first interface can no longer receive valid data packets from the first medium. The second router has a plurality of interfaces that include a third interface and a fourth interface. The second and third interfaces is connected together via a second medium.

A method of forwarding data packets is disclosed according to an embodiment of the present invention. The method receives valid data packets from a first medium with a first interface, and transmits no data packets to the first medium from the first interface unless the first interface can no longer receive valid data packets from the first medium.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 1:
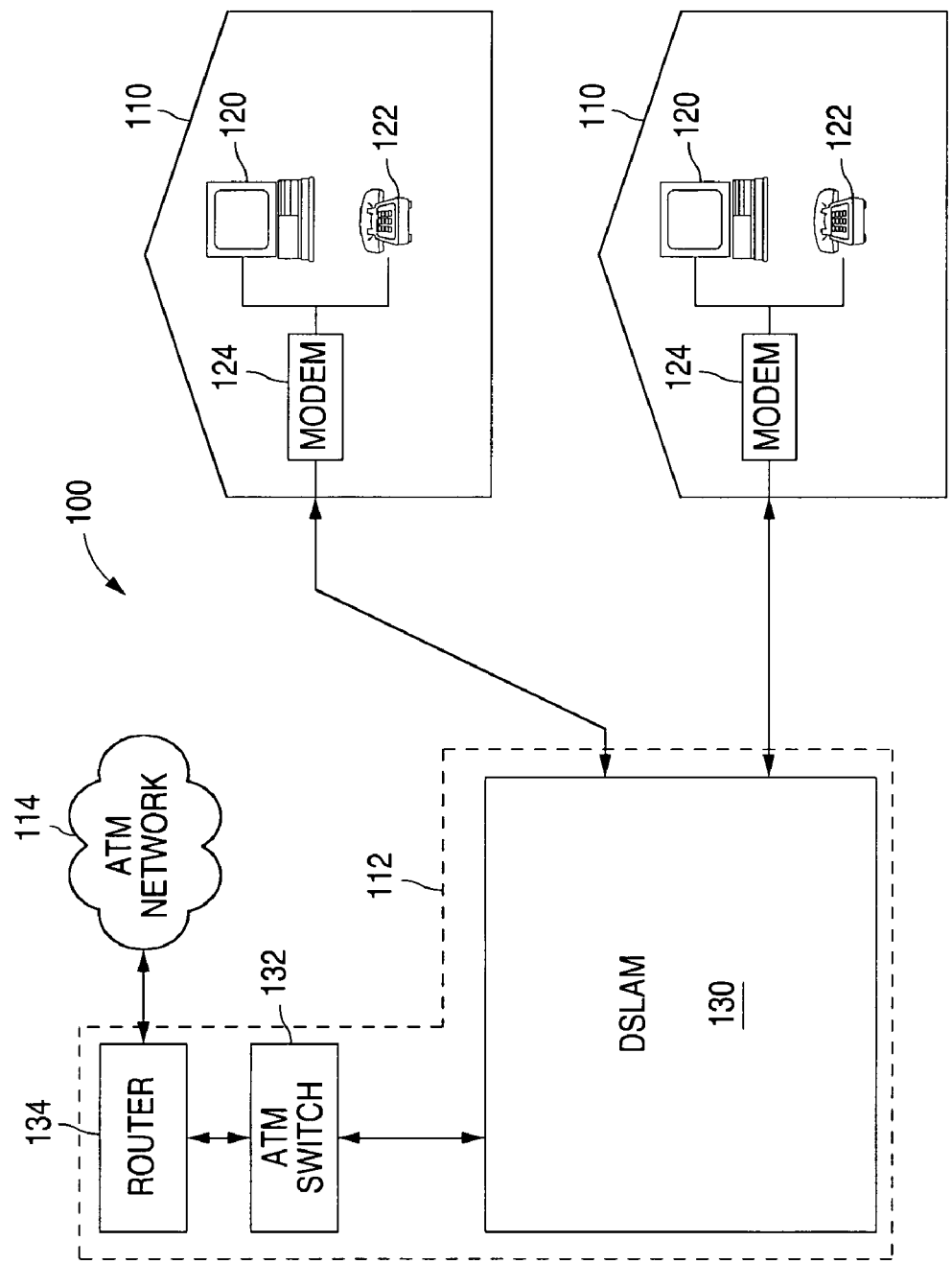
FIG. 1 is a block diagram illustrating a prior-art communications network 100.
Figure 2:
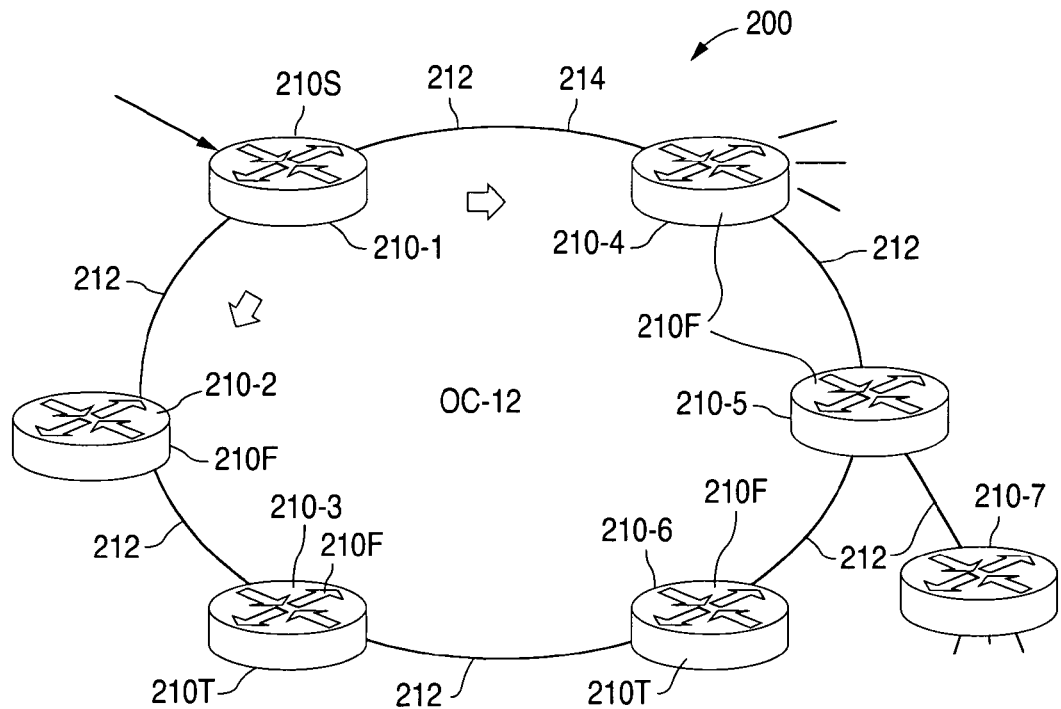
FIG. 2 is a block diagram illustrating a prior-art network 200.
Figure 3:
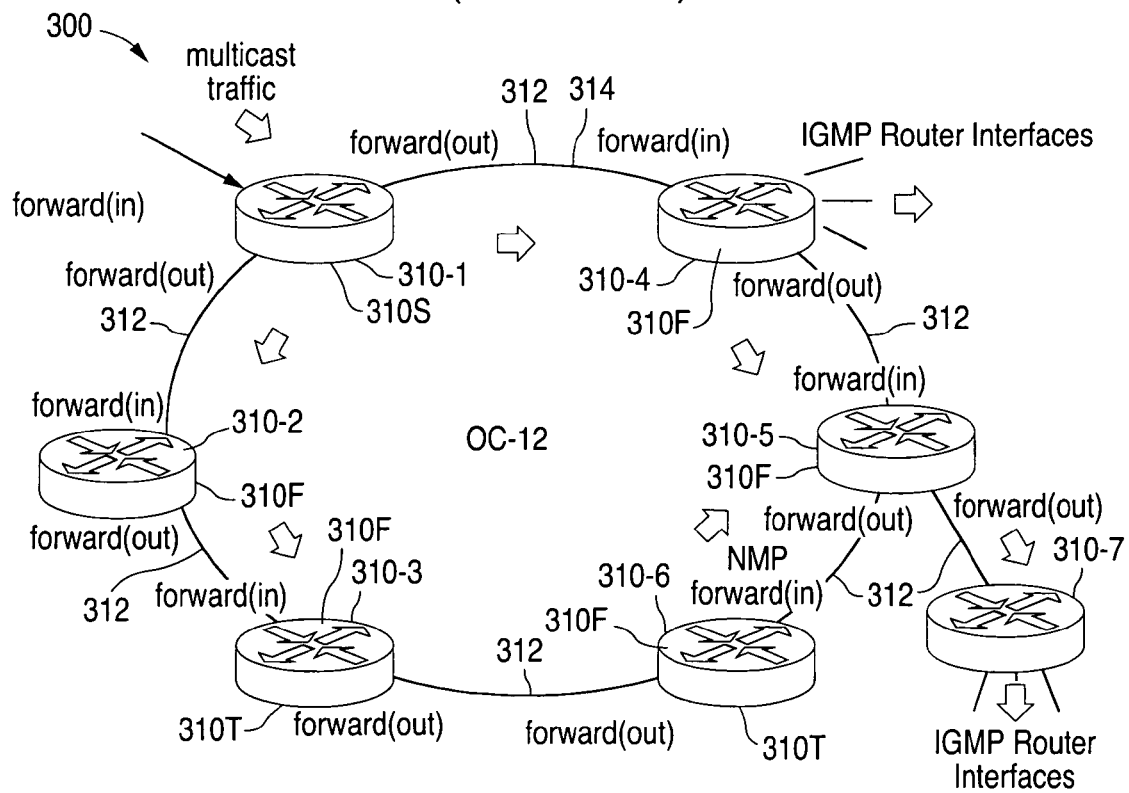
FIG. 3 is a block diagram illustrating an example of a multicasting network 300 in accordance with the present invention.

FIG. 3 shows a block diagram that illustrates an example of a multicasting network 300 in accordance with the present invention. As shown in FIG. 3, network 300 has a number of routers 310, including routers 310-1 through 310-7, and a number of high-speed data lines 312 that are connected to the routers 310 to form an ATM ring 314.

Each router 310 can be connected to an ATM switch which, in turn, is connected to a DSLAM as described above with respect to central office 112. In addition, the high-speed data lines 312 can be implemented with, for example, fiber optic cables to form ATM ring 314 as a synchronous optical network (SONET) ATM ring. Ring 314 can be implemented as, for example, a UASR or a BASR with an OC-12 or higher interface.

In operation, the routers 310 in ring 314 forward multicast data packets. As a result, one router 310 in ring 314 is logically defined to be a source router 310S, while the remaining routers 310 in ring 314 are logically defined to be forwarding routers 310F. The source router 310S identifies a received multicast data packet, passes the data packet on to the ATM switch connected to the DSLAM, and forwards the multicast data packet on in both directions on ring 314 to the other routers 310.

The forwarding routers 310F identify a received multicast data packet, pass the data packet on to the ATM switch connected to the DSLAM, and forward the multicast data packet on in only one direction on ring 314. In addition, although a forwarding router 310F can only forward a multicast data packet in one direction on ring 314, the forwarding router 310F can forward the multicast data packet on to other routers 310.

Further, two forwarding routers 310F in ring 314 are also logically defined to be terminating routers 310T. Terminating routers 310T receive multicast data packets from two directions on ring 314, and only process the multicast data packets from one direction, ignoring the packets from the other direction.

In the example shown in FIG. 3, router 310-1 is logically defined to be source router 310S, while routers 310-2 through 310-6 are logically defined to be forwarding routers 310F. In addition, routers 310-3 and 310-6 are both logically defined to be terminating routers 310T.

As a result, router 310-1 receives a data packet, identifies the packet as a multicast data packet, passes the data packet on to the ATM switch connected to the DSLAM, and forwards the multicast data packet to routers 310-2 and 310-4.

Router 310-2 receives the data packet, and identifies the packet as a multicast data packet. In addition, router 310-2 passes the packet on to the ATM switch connected to the DSLAM, and forwards the multicast data packet to router 310-3. Router 310-3 does the same as router 310-2, and forwards the multicast data packet on to router 310-6. However, as a terminating router, router 310-6 ignores the multicast data packet output by router 310-3.

Similarly, router 310-4 receives the data packet, and identifies the packet as a multicast data packet. Router 310-4 also passes the multicast data packet on to the ATM switch connected to the DSLAM, and forwards the multicast data packet to router 310-5. Router 310-5 does the same as router 310-4, and forwards the multicast data packet on to router 310-6. Router 310-6 does the same as router 310-5, and forwards the multicast data packet on to router 310-3.

However, as a terminating router, router 310-3 ignores the multicast data packet output by router 310-6. In addition, although router 310-5 can only forward the multicast data packet to router 310-6 as the next router on the ring, router 310-5 can also forward the multicast data packet to router 310-7.

Figure 4:
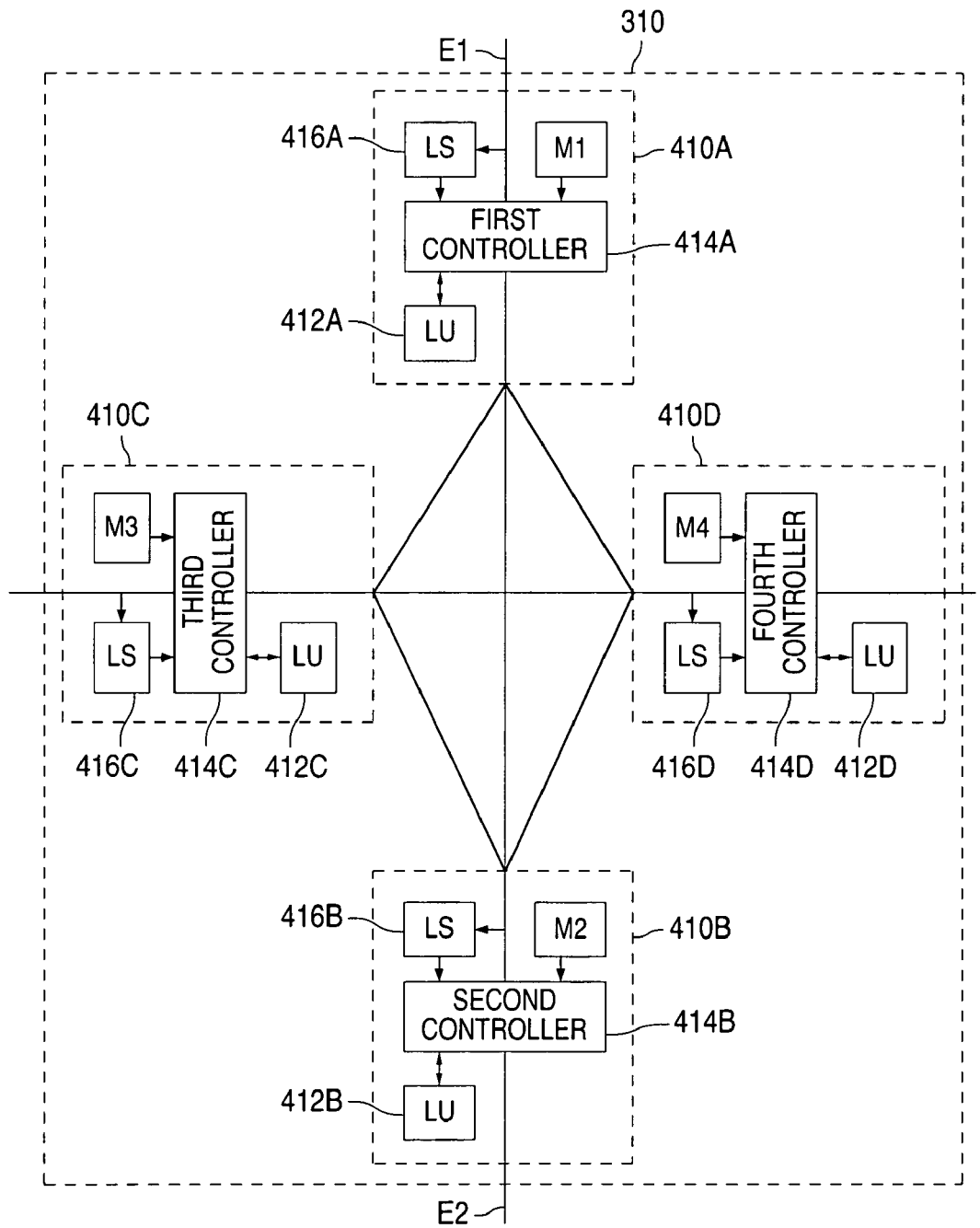
FIG. 4 is a block diagram illustrating an example of router 310 in accordance with the present invention.

FIG. 4 shows a block diagram that illustrates an example of router 310 in accordance with the present invention. As shown in the FIG. 4 example, router 310 has a number of interfaces 410 that include a first interface 410A, a second interface 410B, a third interface 410C, and a fourth interface 410D. (A greater or lesser number of interfaces may be included.) The interfaces 410A-410B are internally connected to each other such that each interface 410A-410D can forward a data packet to any of the remaining interfaces 410A-410D of router 310.

The first interface 410A, which is connected to an external medium E1, such as a fiber optic cable, includes a memory location M1 that stores a value that indicates whether interface 410A can accept a data packet received from external medium E1, and a look up table 412A that can identify other interfaces 410 of router 310.

Further, interface 410A includes a controller 414A that has a multicast packet detection circuit, a forwarding circuit, and a transmission circuit. When memory location M1 indicates that interface 410A can accept a data packet from external medium E1, controller 414A detects and forwards multicast data packets received from medium E1 to one of the other internal interfaces 410 as defined in look up table 412A.

On the other hand, when memory location M1 indicates that interface 410A can not accept a data packet from external medium E1, controller 414A drops multicast packets that are received from medium E1. The transmitting circuit, in turn, receives data packets from other interfaces 410 of router 310 and transmits those packets onto external medium E1.

Similarly, the second interface 410B, which is connected to an external medium E2, such as a fiber optic cable, includes a memory location M2 that stores a value that indicates whether interface 410B can accept a data packet received from external medium E2, and a look up table 412B that can identify other interfaces 410 of router 310.

Further, interface 410B includes a controller 414B that has a multicast packet detection circuit, a forwarding circuit, and a transmission circuit. When memory location M2 indicates that interface 410B can accept a data packet from external medium E2, controller 414B detects and forwards multicast data packets received from medium E2 to one of the other internal interfaces 410 as defined in look up table 412B.

On the other hand, when memory location M2 indicates that interface 410B can not accept a data packet from external medium E2, controller 414B drops multicast packets that are received from medium E2. The transmitting circuit, in turn, receives data packets from other interfaces 410 of router 310 and transmits those packets onto external medium E2.

The third interface 410C, which is connectable to an external medium, includes a memory location M3 that stores a value that indicates whether interface 410C can accept a data packet received from an external medium, and a look up table 412C that can identify other interfaces 410 of router 310. Further, interface 410C includes a controller 414C that has a multicast packet detection circuit, a forwarding circuit, and a transmission circuit.

The fourth interface 410D, which is connectable to an external medium, includes a memory location M4 that stores a value that indicates whether interface 410D can accept a data packet received from an external medium, and a look up table 412D that can identify other interfaces 410 of router 310. Further, interface 410D includes a controller 414D that has a multicast packet detection circuit, a forwarding circuit, and a transmission circuit.

For example, with reference to FIG. 3, during normal multicast operation, the interface of router 310-3 that is connected to router 310-2 is input enabled (the memory location indicates that packets can be received from router 310-2 via the external medium), and has an associated look up table that contains one entry that identifies the interface of router 310-3 that is connected to router 310-6. As a result, when the interface receives multicast packets from router 310-2, the controller passes on the packets to the interface that is connected to router 310-6, which then transmits the packets to router 310-6.

On the other hand, the interface of router 310-6 that is connected to router 310-3 is not input enabled (the memory location indicates that packets can not be received from router 310-3 via the external medium). As a result, when the interface of router 310-6 that is connected to router 310-3 receives a packet from router 310-3, the controller of the interface of router 310-6 that is connected to router 310-3 drops the packet.

Referring back to FIG. 4, interface 410A also includes line sense circuitry 416A that detects fault conditions on external medium E1. Similarly, interfaces 410B, 410C, and 410D have line sense circuitry 416B, 416C, and 416D, respectively. Line sense circuitry 416B detects fault conditions on external medium E2, while circuitry 416C and 416D detect faults of a medium connected to the interfaces.

For example, assume that interface 410A can accept a multicast data packet from medium E1, interface 410B can not accept a data packet from medium E2, and look up table 412A identifies interface 410B. During normal multicasting operation, interface 410A receives and forwards data packets to interface 410B, which then transmits the data packets to medium E2.

When a fault condition, such as a cut cable or equipment failure, is detected by interface 410A, line sense circuitry 416A generates a back up mode packet, and passes the back up mode packet to controller 414A. Once received, controller 414A passes the back up mode packet to interface 410B, and changes memory location M1 to indicate that interface 410A can not accept a data packet from external medium E1.

When interface 410B receives the back up mode packet, controller 414B recognizes the back up mode packet, transmits the back up mode packet onto external medium E2 to the next router 310, and sets memory location M2 to indicate that interface 410B can accept a data packet from external medium E2.

Figure 5:
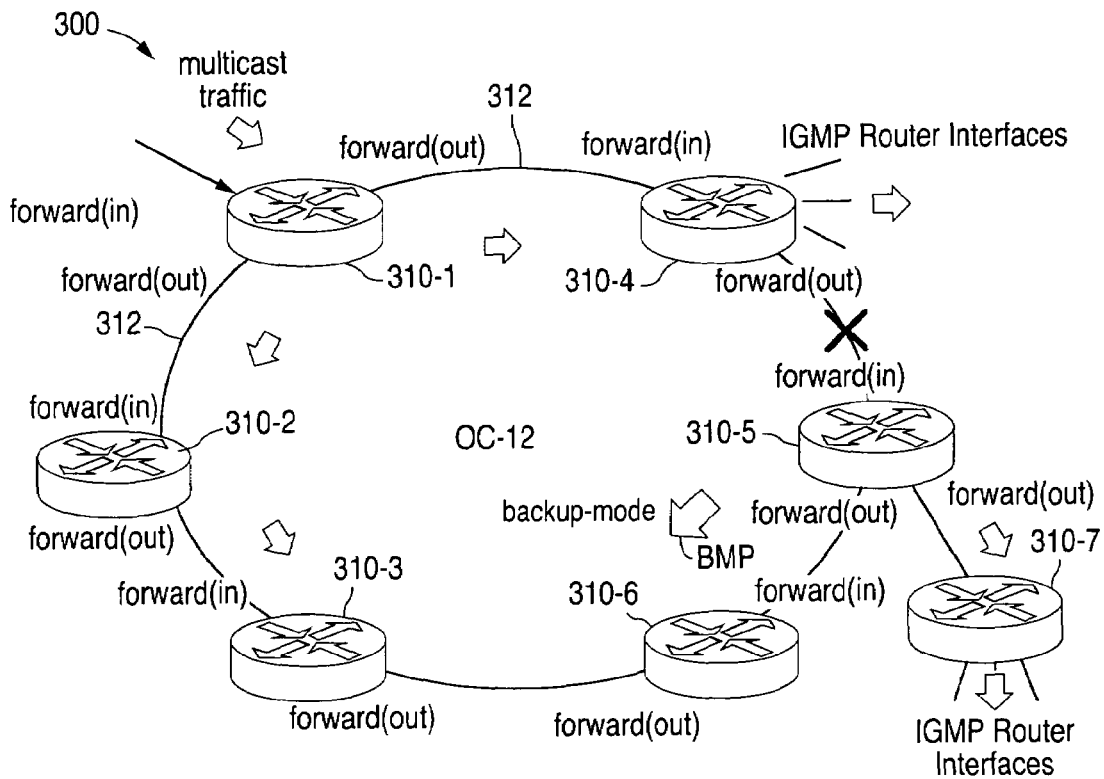
FIG. 5 is a block diagram illustrating an example of network 300 following a cable cut in accordance with the present invention.

FIG. 5 shows a block diagram that illustrates an example of a network 300 following a cable cut in accordance with the present invention. As shown in FIG. 5, network 300 has a cut cable segment between routers 310-4 and 310-5. During a multicasting session, the line sense circuitry monitors the condition of the fiber optic cable input to router 310.

When the line sense circuitry of the interface of router 310-5 that is connected to router 310-4 detects the fault condition, the interface outputs a back up mode packet BMP to the interface of router 310-5 that is connected to router 310-6, and sets its memory location to indicate that the interface can not accept data packets from router 310-4. The interface of router 310-5 that is connected to router 310-6 then transmits the back up mode packet BMP to router 310-6, and sets its memory location to indicate that the interface can accept data packets from router 310-6.

The interface of router 310-6 that receives the back up mode packet BMP from router 310-5 recognizes the packet, forwards the back up mode packet BMP to the interface of router 310-6 that is connected to router 310-3, and sets its memory location to indicate that the interface can not accept data packets from router 310-5.

The interface of router 310-6 that is connected to router 310-3 recognizes the packet, transmits the back up mode packet BMP to the interface of router 310-3 that is connected to router 310-6, and sets its memory location to indicate that the interface can accept data packets from router 310-3.

The interface of router 310-3 that is connected to router 310-6 drops the back up mode packet BMP because the interface of router 310-3 that is connected to router 310-6 is not input enabled (the memory location indicates that packets can not be received from router 310-6 via the external medium).

Figure 6:
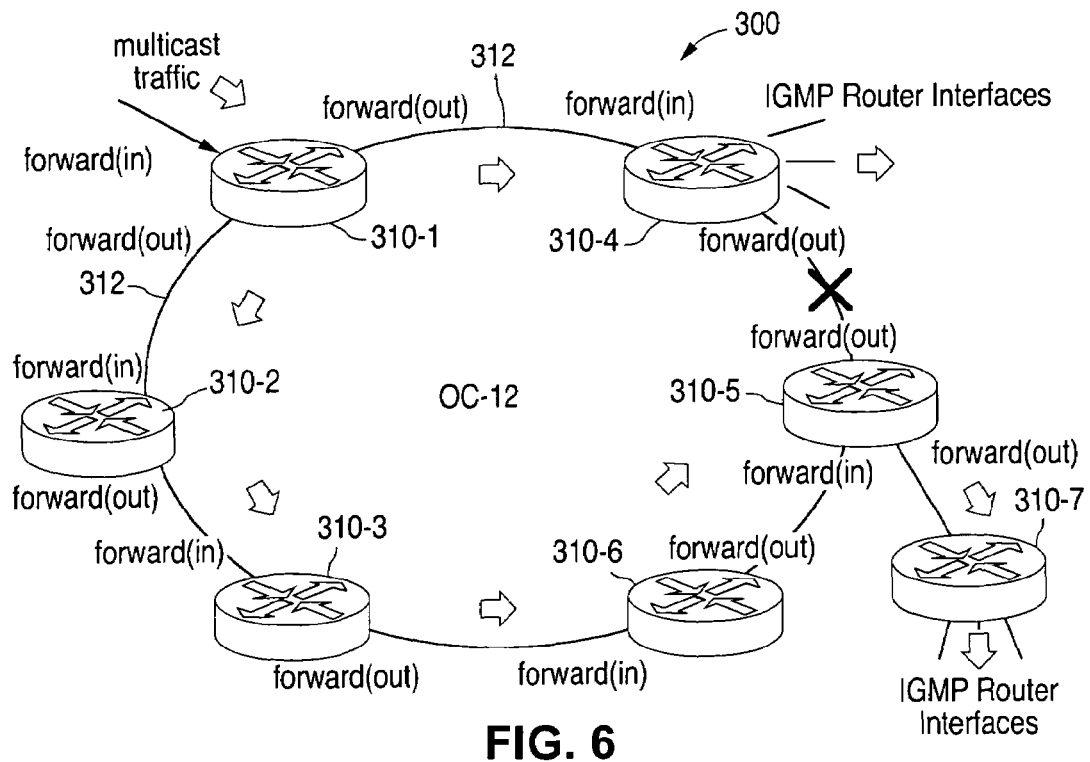
FIG. 6 is a block diagram illustrating an example of network 300 after router 310-6 has reversed its input and output circuits in accordance with the present invention.

FIG. 6 shows a block diagram that illustrates an example of network 300 after router 310-6 has reversed its input and output interfaces in accordance with the present invention. As shown in FIG. 6, after the interface of router 310-6 that is connected to router 310-3 has set its memory location to indicate that data packets can now be receivied, the multicast data packets from router 310-3 that were originally ignored by router 310-6 are now received by router 310-6.

The interface of router 310-6 that is connected to router 310-3 identifies the packet as a multicast data packet, and passes the multicast data packet on to the ATM switch connected to the DSLAM. In addition, the interface checks its look up table, and passes the multicast data packets on to the interface which is connected to router 310-5, which then transmits the packets to router 310-5.

Router 310-5 does the same as router 310-6, and forwards the multicast data packet on to router 310-7. Thus, when a fault condition is detected in a multicasting session, the line sense circuits in the effected routers respond to the condition so that the effected routers can be quickly reconfigured to maintain a continual flow of multicast data to the effected routers.

Once the broken cable or equipment failure has been fixed and the user wants ring 314 to return to the original normal mode of operation, the user manually configures router 310-6 to go back to the normal mode. Specifically, the user sets the memory location to indicate that the interface connected to router 310-5 can now accept data packets from router 310-5, while the interface that is connected to router 310-3 can no longer accept data packets from router 310-3.

In addition, as shown in FIG. 3, router 310-6 sends out a normal mode packet NMP to router 310-5 which, in turn, sets its memory location to indicate that the interface connected to router 310-4 can now accept data packets from router 310-4, while the interface connected to router 310-6 can no longer accept data packets from router 310-6.

Further, router 310-5 also forwards the normal mode packet NMP to router 310-4. However, since the interface of router 310-4 is not input enabled (the memory location indicates that packets can not be received from the external medium), router 310-4 ignores the normal mode packet NMP from router 310-5. At this point, the network reverts back to the original operating condition.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A network comprising:
a first router having a plurality of interfaces that include a first interface and a second interface, the first interface having a connection to receive multicast data packets from a first medium and transmit multicast data packets to the first medium, the first interface to receive multicast data packets output by a source router from the first medium, and transmit no multicast data packets to the first medium unless the first interface is unable to receive multicast data packets output by the source router from the first medium, the first interface to receive a back-up mode packet when the first interface is unable to receive multicast data packets output by the source router from the first medium, the second interface to forward multicast data packets received by the first interface from the first medium to the second medium, and forward the back-up mode packet received by the first interface to the second medium, the second interface to receive no multicast data packets from the second medium until after the back-up mode packet has been forwarded; and
a second router having a plurality of interfaces that include a third interface and a fourth interface, the second and third interfaces being connected together via a second medium, the first medium and the second medium being segments of a single ring, the third interface to receive multicast data packets and the back-up mode packet from the second medium, the third interface to forward no multicast data packets to the second medium until after the back-up mode packet has been received, the fourth interface to receive no multicast data packets from a third medium until after the back-up mode packet has been received.

2. A network comprising:
a first router having a plurality of interfaces that include a first interface and a second interface, the first interface having a connection to receive multicast data packets from a first medium and transmit multicast data packets to the first medium, the first interface to receive multicast data packets output by a source router from the first medium, and transmit no multicast data packets to the first medium unless the first interface is unable to receive multicast data packets output by the source router from the first medium, the first interface to receive a back-up mode packet when the first interface is unable to receive multicast data packets output by the source router from the first medium, the second interface to forward multicast data packets received by the first interface from the first medium to the second medium, and forward the back-up mode packet received by the first interface to the second medium; and
a second router having a plurality of interfaces that include a third interface and a fourth interface, the second and third interfaces being connected together via a second medium, the first medium and the second medium being segments of a single ring, the third interface to receive multicast data packets and the back-up mode packet from the second medium, the third interface to forward a normal mode packet to the second medium after a fault condition has been removed, the third interface to forward no multicast data packets to the second medium after the normal mode packet has been forwarded until another back-up mode packet is received by the third interface.

3. The network of claim 2 wherein:

the second interface receives the normal mode packet from the second medium, and receives no multicast data packets from the second medium after the normal mode packet has been received until the second interface forwards another back-up mode packet to the second medium; and the first interface transmits no multicast data packets to the first medium after the normal mode packet has been received until the first interface is unable to receive multicast data packets output by the source router from the first medium.

4. A method of forwarding data packets, the method comprising:

receiving multicast data packets output by a source router from a first optical fiber with a first interface;

transmitting no multicast data packets to the first optical fiber with the first interface unless the first interface is unable to receive multicast data packets output by the source router from the first optical fiber;

receiving a back-up mode packet from the first optical fiber with the first interface when the first interface is unable to receive multicast data packets output by the source router from the first optical fiber;

forwarding multicast data packets received by the first interface from the first optical fiber to a second optical fiber with a second interface, and the back-up mode packet to the second optical fiber with the second interface;

receiving no multicast data packets from the second optical fiber with the second interface until after the back-up mode packet has been forwarded by the second interface;

receiving a normal mode packet from the second optical fiber with the second interface; and receiving no multicast data packets from the second optical fiber with the second interface after the normal mode packet has been received until the second interface forwards another back-up mode packet to the second optical fiber.

5. The method of claim 4 and further comprising transmitting no multicast data packets to the first optical fiber with the first interface after the normal mode packet has been received until the first interface is unable to receive multicast data packets output by the source router from the first optical fiber.

6. A router comprising:

a first interface, the first interface to forward multicast data packets received from a first medium when the first interface is permitted to accept multicast data packets from the first medium, forward no multicast data packets to the first medium when the first interface is permitted to accept multicast data packets from the first medium, and forward multicast data packets to the first medium when the first interface is not permitted to accept multicast data packets from the first medium; and a second interface, the second interface to receive multicast data packets from the first interface when the first interface is permitted to accept multicast data packets from the first medium, forward multicast data packets received from the first interface to a second medium when the first interface is permitted to accept multicast data packets from the first medium, and drop multicast data packets received from the second medium when the first interface is permitted to accept multicast data packets from the first medium.

7. The router of claim 6 wherein the first interface receives a back-up mode packet that indicates when the first interface is not permitted to receive multicast data packets from the first medium, and forwards the back up mode packet to the second interface.

8. The router of claim 6 wherein the second interface forwards multicast data packets received from second medium to the first interface when the first interface is not permitted to accept multicast data packets from the first medium.

9. The router of claim 8 wherein:

the second interface receives a normal mode packet when the first interface is again permitted to accept multicast data packets from the first medium, forwards the normal mode packet to the first interface, and stops forwarding multicast data packets to the first interface after the normal mode packet has been received; and the first interface begins forwarding multicast data packets to the second interface after the first interface receives the normal mode packet.

10. The router of claim 6 and further comprising line sense circuitry that detects a fault condition that indicates that an interface is unable to receive multicast data packets output by the source router from a medium.

11. A method of forwarding data packets, the method comprising:

forwarding multicast data packets received from a first medium with a first interface when the first interface is permitted to accept multicast data packets from the first medium;

forwarding no multicast data packets to the first medium with the first interface when the first interface is permitted to accept multicast data packets from the first medium;

forwarding multicast data packets to the first medium when the first interface is not permitted to accept multicast data packets from the first medium;

receiving multicast data packets from the first interface by a second interface when the first interface is permitted to accept multicast data packets from the first medium; and dropping multicast data packets received from a second medium by the second interface when the first interface is permitted to accept multicast data packets from the first medium.

12. The method of claim 11 and further comprising:

receiving a back-up mode packet from the first medium by the first interface that indicates when the first interface is not permitted to receive multicast data packets from the first medium;

forwarding the back up mode packet to the second interface; and forwarding multicast data packets received from the second medium by the second interface to the first interface when the first interface is not permitted to accept multicast data packets from the first medium.

13. The method of claim 12 and further comprising:

receiving a normal mode packet by the second interface when the first interface is again permitted to accept multicast data packets from the first medium;

forwarding the normal mode packet received by the second interface to the first interface;

stopping multicast data packets from being forwarded to the first interface after the normal mode packet has been received by the second interface; and forwarding multicast data packets to the second interface from the first interface after the normal mode packet has been received by the first interface.

14. The method of claim 11 and further comprising forwarding multicast data packets received from the second medium to the first interface when the first interface is not permitted to accept multicast data packets from the first medium.

* * * * *

UNITED STATES PATENT AND TRADEMARK OFFICE
CERTIFICATE OF CORRECTION

PATENT NO.           : 7,486,612 B2                                        Page 1 of 1
APPLICATION NO. : 10/315607
DATED                : February 3, 2009
INVENTOR(S)       : Allen Tsz-Chiu Wong et al.

It is certified that error appears in the above-identified patent and that said Letters Patent is hereby corrected as shown below:

Title Page,
Item (56) References Cited, U.S. PATENT DOCUMENTS, Page 1, Col. 1, insert --5,805,568 09-1998 Shinbashi 370/223--.

Signed and Sealed this

Seventh Day of April, 2009

JOHN DOLL
*Acting Director of the United States Patent and Trademark Office*